United States Patent
Shen

(10) Patent No.: US 9,036,238 B2
(45) Date of Patent: May 19, 2015

(54) MICRO ELECTRO MECHANICAL DISPLAY MODULE

(71) Applicant: HTC Corporation, Taoyuan County (TW)

(72) Inventor: Weng-Chang Shen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 345 days.

(21) Appl. No.: 13/746,317

(22) Filed: Jan. 22, 2013

(65) Prior Publication Data

US 2014/0204441 A1 Jul. 24, 2014

(51) Int. Cl.
G02B 26/02 (2006.01)

(52) U.S. Cl.
CPC .................................. *G02B 26/02* (2013.01)

(58) Field of Classification Search
CPC . G02B 26/02; G02B 26/0841; G02B 26/0833
USPC ......................................... 359/227, 230, 233
See application file for complete search history.

(56) References Cited

U.S. PATENT DOCUMENTS

2014/0184573 A1* 7/2014 Nemchuk et al. ............. 345/204

* cited by examiner

*Primary Examiner* — James Phan
(74) *Attorney, Agent, or Firm* — Jianq Chyun IP Office

(57) ABSTRACT

A micro electro mechanical display module including a first substrate, a light source and a color filter layer is provided. The first substrate includes a first substrate body, a light-shielding pattern layer and light-shielding units. The light-shielding pattern layer has first openings. Each light-shielding unit includes a light-shielding shutter having one second opening. The shutter light-shielding shutter is movable relative to the light-shielding pattern layer. When one of the light-shielding units is enabled, the second opening is aligned with one of the first openings, so that the white light provided by the light source passes through the light-shielding pattern layer and the one of the light-shielding units and then passes through the color filter layer. When the one of the light-shielding units is not enabled, the second opening is not aligned with the one of the first openings, so that the white light is blocked by the light-shielding shutter.

11 Claims, 5 Drawing Sheets

MICRO ELECTRO MECHANICAL DISPLAY MODULE

TECHNICAL FIELD

The invention relates to a display module, more particularly to a micro electro mechanical display module.

BACKGROUND

Micro electro mechanical system (MEMS) is the technology of very small mechanical devices driven by electricity. It merges at the nano-scale into nanoelectromechanical systems (NEMS) and nanotechnology. MEMS are also referred to as micromachines (in Japan), or micro systems technology—MST (in Europe). MEMS are separate and distinct from the hypothetical vision of molecular nanotechnology or molecular electronics. MEMS are made up of components between 1 to 100 micrometers in size (i.e. 0.001 to 0.1 mm), and MEMS devices generally range in size from 20 micrometer to a millimeter.

MEMS have been applied in many products, as a display module. The conventional micro electro mechanical display module comprises a light source and a micro electro mechanical display panel. The light source provides a red light, when the micro electro mechanical display panel displays a red picture. The light source provides a green light, when the micro electro mechanical display panel displays a green picture. The light source provides a blue light, when the micro electro mechanical display panel displays a blue picture. The conventional micro electro mechanical display module can provide the colorful image through displaying the red picture, the green picture and the blue picture in a short time. However, when the observer moves, the color breakup of the conventional micro electro mechanical display module may be sensed by the observer. Moreover, a light reflected by the metal line of the micro electro mechanical display panel causes a bad performance of the conventional micro electro mechanical display module.

SUMMARY

An exemplary embodiment of the invention provides a micro electro mechanical display module, which has good optical performance.

An exemplary embodiment of the invention provides a micro electro mechanical display module. The micro electro mechanical display module comprises a first substrate, a light source and a color filter layer. The first substrate comprises a first substrate body, a light-shielding pattern layer and a plurality of light-shielding units. The light-shielding pattern layer is disposed on the first substrate body and has a plurality of first openings. The light-shielding units are disposed above the light-shielding pattern layer. Each of the light-shielding units comprises a light-shielding shutter having at least one second opening. The shutter light-shielding shutter is movable relative to the light-shielding pattern layer. The light source is disposed below the first substrate for providing a white light. A color filter layer is disposed in an optical path of the white light. When one of the light-shielding units is enabled, the second opening of the light-shielding shutter is aligned with one of the first openings, so that the white light provided by the light source passes through the light-shielding pattern layer and the one of the light-shielding units and then passes through the color filter layer. When the one of the light-shielding units is not enabled, the second opening of the light-shielding shutter is not aligned with the one of the first openings, so that the white light provided by the light source is blocked by the light-shielding shutter.

According to the micro electro mechanical display module of one embodiment of the invention, the color filter layer has a plurality of first color filtering regions, a plurality of second color filtering regions, a plurality of third color filtering regions, and a plurality of transparent regions covering the light-shielding units.

According to the micro electro mechanical display module of one embodiment of the invention, the first color filtering regions are a plurality of red filtering regions, the second color filtering regions are a plurality of green filtering regions, the third color filtering regions are a plurality of blue filtering regions, and the transparent regions are a plurality of third openings.

According to the micro electro mechanical display module of one embodiment of the invention, each of the light-shielding units further comprises an active device. The active device is capable making the light-shielding shutter relatively move for the light-shielding pattern layer.

According to the micro electro mechanical display module of one embodiment of the invention, each of the light-shielding units further comprises an actuator connecting to the light-shielding shutter. When the one of the light-shielding units is enabled, there is a voltage difference between the actuator and one drain of the active device. Thereby, the actuator is attracted by the drain of the active device so that the light-shielding shutter relatively moves for the light-shielding pattern.

According to the micro electro mechanical display module of one embodiment of the invention, each of the light-shielding units further comprises an actuator connecting to the light-shielding shutter. When the one of the light-shielding units is not enabled, there is substantially no voltage difference between the actuator and one drain of the active device.

According to the micro electro mechanical display module of one embodiment of the invention, the micro electro mechanical display module further comprises a plurality of data lines and a plurality of scan lines. The data lines and the scan lines are disposed on the first substrate body and interlaced. A plurality of sources of the active devices are electrically connected to the data lines. A plurality of gates of the active devices are electrically connected to the scan lines.

According to the micro electro mechanical display module of one embodiment of the invention, the color filter layer has a light-shielding region covering the data lines and the scan lines.

According to the micro electro mechanical display module of one embodiment of the invention, the first substrate is disposed between the light source and the color filter layer.

According to the micro electro mechanical display module of one embodiment of the invention, the micro electro mechanical display module further comprises a second substrate. The color filter layer is disposed on the second substrate. There is a gap between the first substrate and the second substrate.

According to one of embodiments of the invention, the micro electro mechanical display module of the embodiment can overcome the problem of color breakup in the conventional micro electro mechanical display through the cooperation of the light source provided a white light and the color filter layer.

The invention and certain merits provided by the invention can be better understood by way of the following exemplary embodiments and the accompanying drawings, which are not to be construed as limiting the scope of the invention.

DETAILED DESCRIPTION OF DISCLOSED EMBODIMENTS

Figure 1:
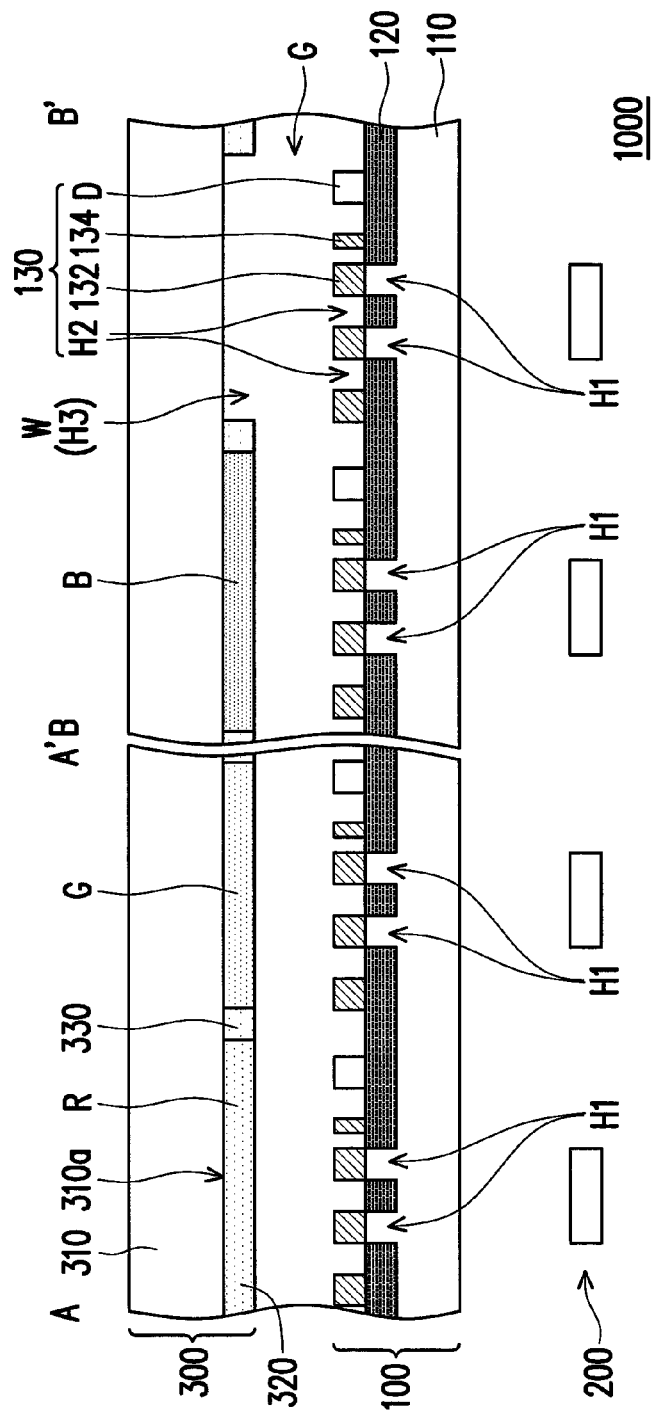
FIG. 1 is a cross-sectional view of a micro electro mechanical display module according to one embodiment of the present invention.
Figure 2:
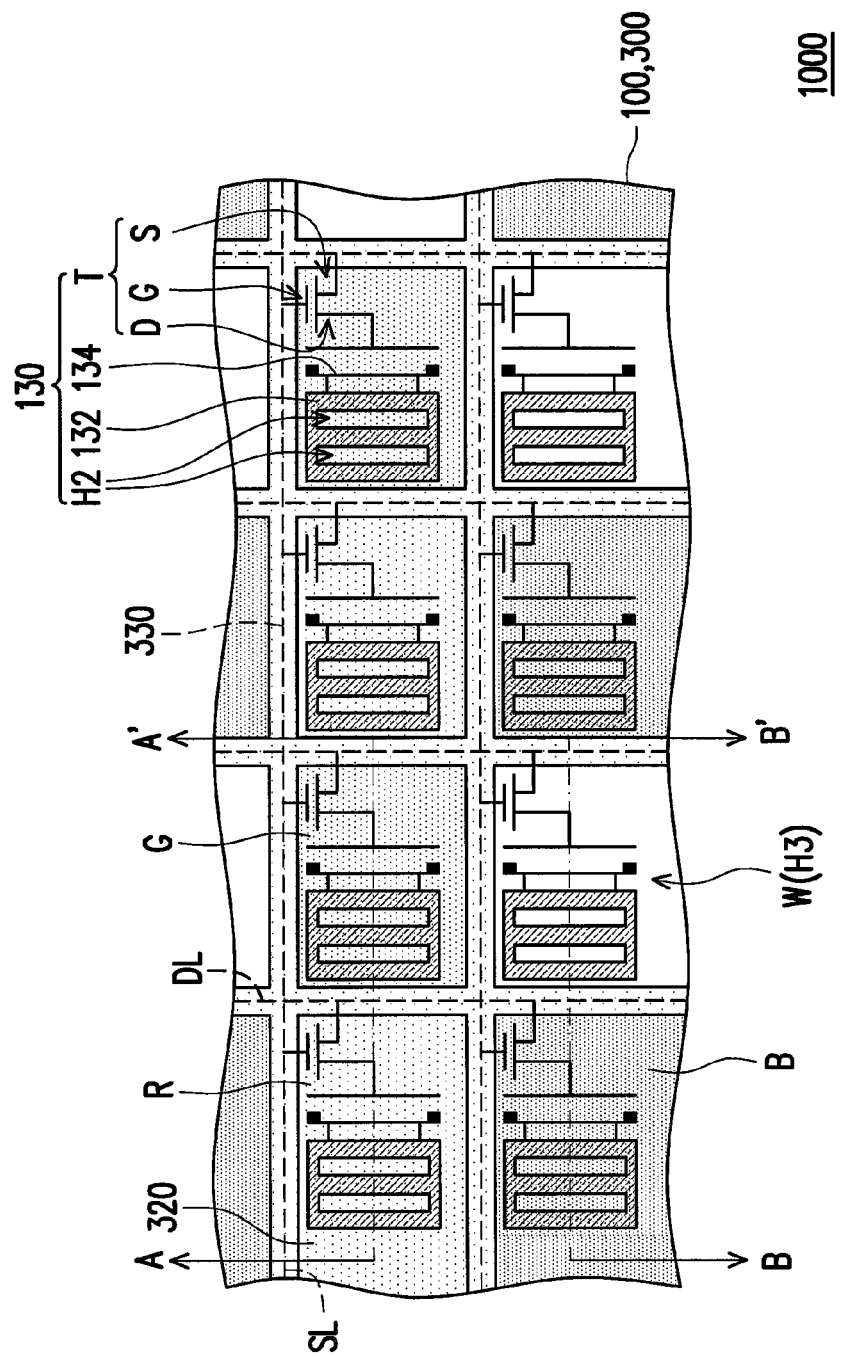
FIG. 2 is a top schematic view of the micro electro mechanical display module shown in FIG. 1.

FIG. 1 is a cross-sectional view of a micro electro mechanical display module 1000 according to one embodiment of the present invention. FIG. 2 is a top schematic view of the micro electro mechanical display module 1000 shown in FIG. 1. It should be noted that FIG. 1 is the cross-sectional view along lines A-A' and B-B' shown in FIG. 2, and a light-shielding pattern layer and a light source shown in FIG. 1 are omitted by FIG. 2. Referring to FIG. 1 and FIG. 2, a micro electro mechanical display module 1000 of the present embodiment includes a first substrate 100, a light source 200, and a second substrate 300. The light source 200 is disposed below the first substrate 100 for providing white light. The white light includes visible light. In the other word, a wavelength distribution of the white light at least includes 400 nm-700 nm. In the present embodiment, the light source 200 may include a plurality of white light LEDs. However, the invention is not limited thereto. In other embodiments, the light source 200 may be a CCFL or other suitable illuminating devices.

Figure 3:
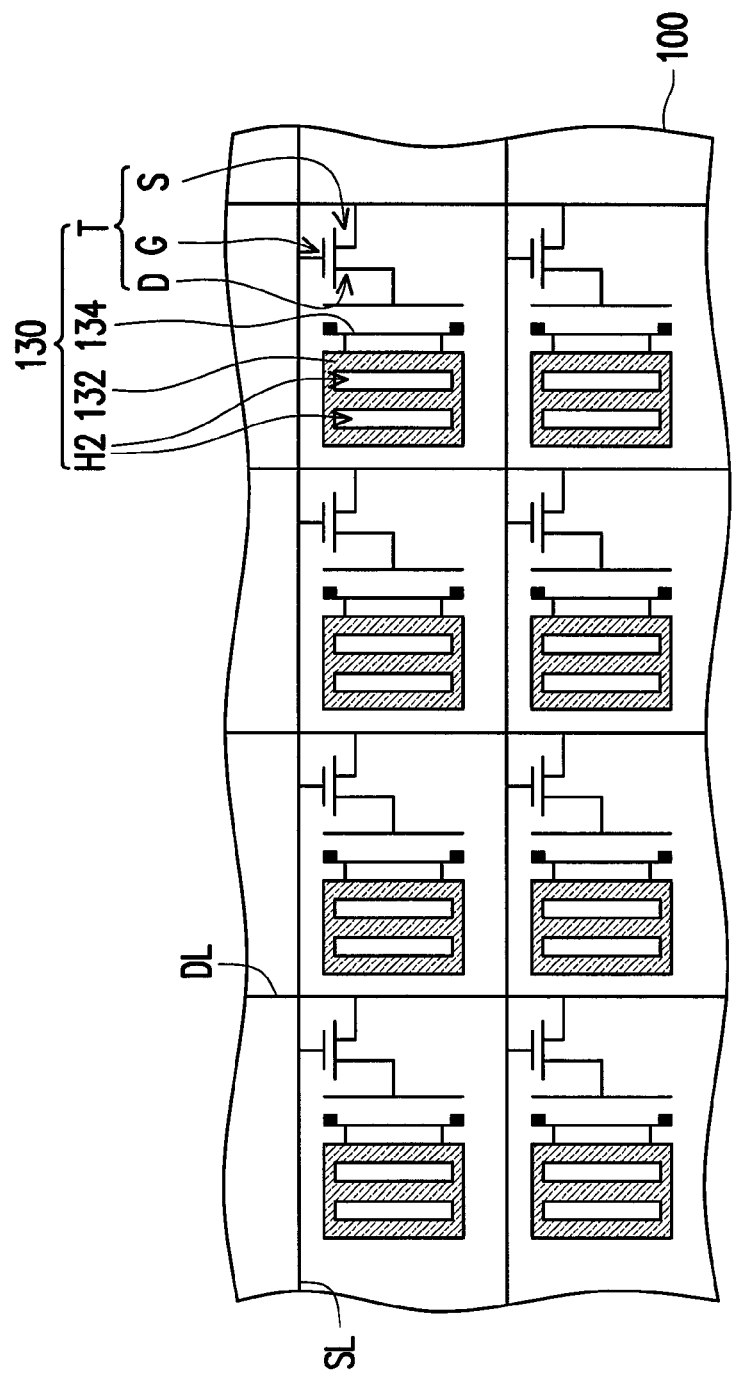
FIG. 3 is a top schematic view of the first substrate shown in FIG. 2.

FIG. 3 is a top schematic view of the first substrate 100 shown in FIG. 2. Referring to FIG. 1, FIG. 2 and FIG. 3, the first substrate 100 includes a first substrate body 110, a light-shielding pattern layer 120, and a plurality of light-shielding units 130. The light-shielding pattern layer 120 is disposed on the first substrate body 110. As shown in FIG. 2 and FIG. 3, the light-shielding units 130 are arranged in a matrix and disposed above the light-shielding pattern layer 120. As shown in FIG. 1, in the present embodiment, the light-shielding pattern layer 120 and the light-shielding units 130 are disposed on the same surface of the first substrate body 110. However, the invention is not limited thereto. In other embodiments, the light-shielding pattern layer 120 and the light-shielding units 130 may be respectively disposed in two opposite surfaces of the first substrate body 110. In the present embodiment, the first substrate body 110 is transparent. The first substrate body 110 may be a hard substrate body or a flexible substrate body. The martial of the first substrate body 110 may be glass, plastics or other suitable martial.

Referring to FIG. 1, FIG. 2 and FIG. 3, the light-shielding pattern layer 120 of the present embodiment has a plurality of first openings H1 (shown in FIG. 1). Each of the light-shielding units 130 includes a light-shielding shutter 132. The light-shielding shutter 132 has at least one second opening H2 and is movable relative to the light-shielding pattern layer 120. By the cooperation of the light-shielding pattern layer 120 and the light-shielding shutters 132, the micro electro mechanical display module 100 can display an image. The mechanism of displaying the image will be illustrated with reference to the FIG. 4A, FIG. 4B, FIG. 5A and FIG. 5B.

Figure 4A:
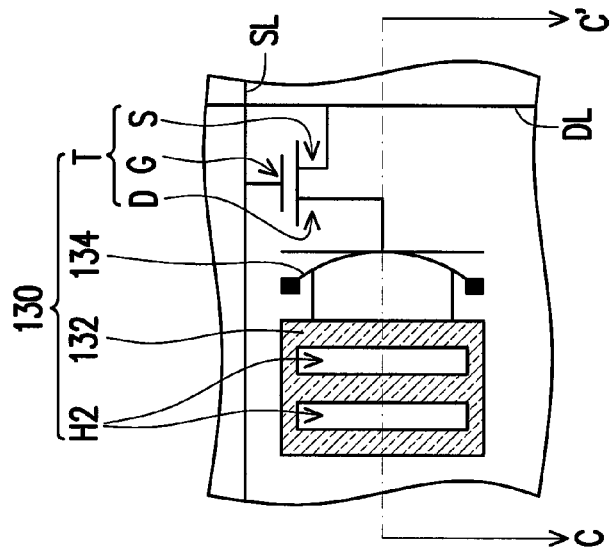
FIG. 4A illustrates a cross-sectional view of a part of the micro electro mechanical display module shown in FIG. 1.
Figure 4B:
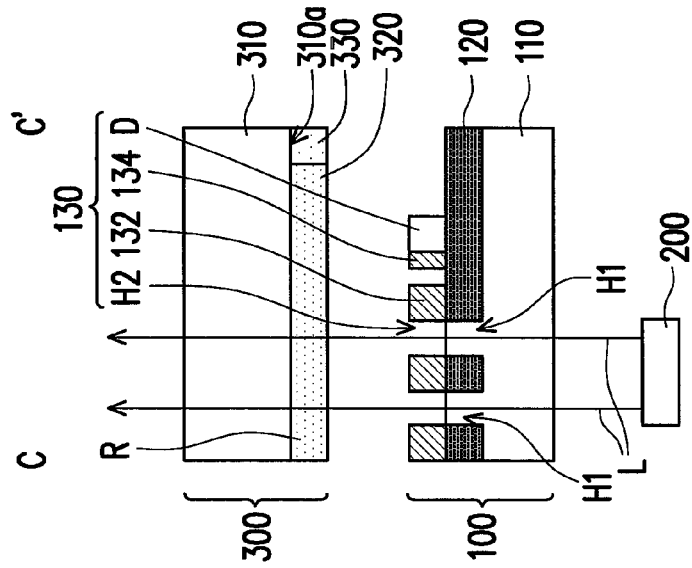
FIG. 4B is a top schematic view of a part of the first substrate shown in FIG. 4A.

FIG. 4A illustrates a cross-sectional view of a part of the micro electro mechanical display module 1000 shown in FIG. 1. FIG. 4B is a top schematic view of a part of the first substrate 100 shown in FIG. 4A. It should be noted that FIG. 4A is the cross-sectional view along a line C-C' shown in FIG. 4B, and a light-shielding unit 130 shown in FIG. 4A and FIG. 4B is enabled. Referring to FIG. 4A and FIG. 4B, when one of the light-shielding units 130 is enabled, the second openings H2 of the light-shielding shutter 132 are aligned with the first openings H1, respectively, so that the white light L provided by the light source 200 can pass through the first substrate 100 through the openings H1 of the light-shielding pattern layer 120 and the openings H2 of the light-shielding shutter 132.

In detail, as shown in FIG. 3 and FIG. 4B, each of the light-shielding units 130 of the present embodiment may further comprise a transistor T, which may be a MOSFET or other similar type of transistors. The transistor T has a source S, a gate G and a drain D. The micro electro mechanical display module 1000 may further comprise a plurality of data lines DL and a plurality of scan lines SL. The data lines DL and the scan lines SL are disposed on the first substrate body 110 and interlaced. The sources S of the transistors T are electrically connected to the data lines DL. The gates G of the transistors T are electrically connected to the scan lines SL.

The transistor T of the present embodiment is capable of controlling the light-shielding shutter 132 to move relative to the light-shielding pattern layer 120. Referring to FIG. 4A and FIG. 4B, in detail, each of the light-shielding units 130 further comprises an actuator 134 connecting to the light-shielding shutter 132 and coupled to the drain D of the transistor T. The actuator 134 of the present embodiment may be a . metal elastic device. When the gate G of the transistor T receives a scanning signal, which is used to turned on the transistor T, from the scan line SL and the source S of the transistor T receives a driving signal from a data line DL, a voltage difference is generated between the actuator 134 and the drain D of the active device T so that the light-shielding unit 130 is enabled. When the light-shielding unit 130 is enabled, the actuator 134 may be attracted by the drain D of the transistor T so that the light-shielding shutter 132 moves toward the drain D, and the second openings H2 of the light-shielding shutter 132 are aligned with the first openings H1, respectively. Thereby, the white light L provided by the light source 200 can pass through the light-shielding pattern layer 120 and the light-shielding unit 130. Accordingly, a region, e.g. a sub-pixel, of the micro electro mechanical display module 1000 corresponding to the light-shielding unit 130 enabled presents a bright state.

Figure 5B:
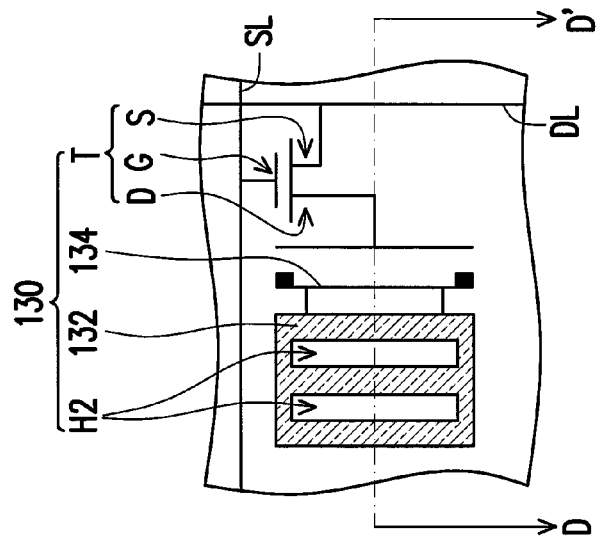
FIG. 5B is a top schematic view of a part of the first substrate shown in FIG. 5A.
Figure 5A:
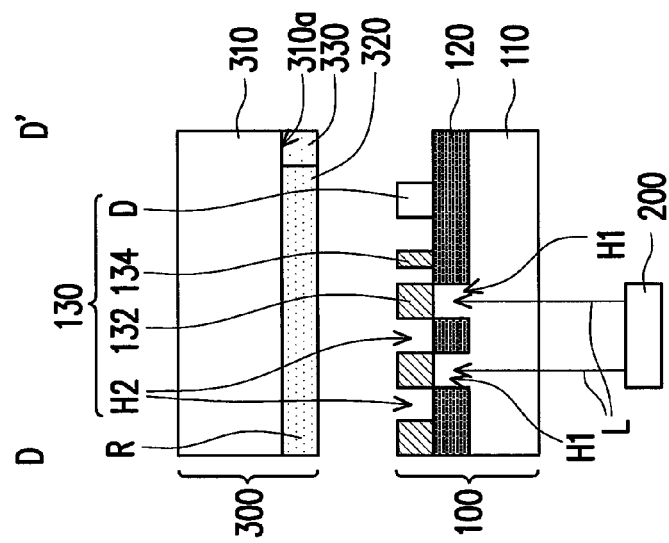
FIG. 5A illustrates a cross-sectional view of a part of the micro electro mechanical display module shown in FIG. 1.

FIG. 5A illustrates a cross-sectional view of a part of the micro electro mechanical display module 1000 shown in FIG. 1. FIG. 5B is a top schematic view of a part of the first substrate 100 shown in FIG. 5A. It should be noted that FIG. 5A is the cross-sectional view along a line D-D' shown in FIG. 5B, and a light-shielding unit shown in FIG. 5A and FIG. 5B is not enabled. Referring to FIG. 5A and FIG. 5B, when the light-shielding unit 130 is not enabled, the light-shielding shutter 132 of the light-shielding unit 130 covers the first openings H1, that is, the second openings H2 of the light-shielding shutter 132 are not aligned with the first openings H1, respectively.

In detail, when the gate G of the transistor T does not receive a scanning signal, which is used to turned on the transistor T, from the scan line SL and the source S of the transistor T does not receive a driving signal from a data line DL, there is substantially no voltage difference generated between the actuator 134 and the drain D of the active device T so that the light-shielding unit 130 is not enable. When the light-shielding unit 130 is not enabled, the actuator 134 is not attracted by the drain D of the transistor T so that the light-shielding shutter 132 of the light-shielding unit 130 covers the first openings H1, that is, the second openings H2 of the light-shielding shutter 132 are not aligned with the first openings H1, respectively. Thereby, the white light L provided by the light source 200 is blocked by the light-shielding shutter 132. Accordingly, the white light L is not allowed to pass through the first substrate 100 so that a region, e.g. a sub-pixel, of the micro electro mechanical display module 1000 corresponding to the light-shielding unit 130 which is not enabled presents a dark state. By the above-mentioned mechanism, i.e. enabling or not enabling the light-shielding unit 130, the micro electro mechanical display module 1000 can display the image.

Referring to FIG. 1 FIG. 2 and FIG. 4, the second substrate 300 includes a second substrate body 310 and a color filter layer 320, which is disposed on a lower surface 310a of the second substrate body 310 and in an optical path of the white light L above the first substrate 100. A gap G is between the first substrate 100 and the second substrate 300. In the present embodiment, the second substrate body 310 is transparent. The second substrate body 310 may be a hard substrate body or a flexible substrate body. The martial of the second substrate body 310 may be glass, plastics or other suitable martial. In the present embodiment, the color filter layer 320 is arranged in an optical path of the white light L above the first substrate 100. However, the invention is not limited thereto. In other embodiments, the color filter layer 320 may be disposed between the light source 200 and the first substrate 100 or be integrated into the first substrate 100.

The color filter layer 320 of the present embodiment has a plurality of first color filtering regions R, a plurality of second color filtering regions G, a plurality of third color filtering regions B, and a plurality of transparent regions W. The first color filtering regions R, the second color filtering regions G, the third color filtering regions B and the transparent regions W cover the light-shielding units 130, respectively, to form a plurality of sub-pixels of the display module 1000. In the other word, each sub-pixel includes one of the color filtering regions R, G and B and one light-shielding unit 130. In the present embodiment, the first color filtering regions R may be a plurality of red filtering regions, the second color filtering regions G may be a plurality of green filtering regions, the third color filtering regions B may be a plurality of blue filtering regions, and the transparent regions W may be a plurality of third openings H3. It should be noted that the arrangement of the first color filtering regions R, the second color filtering regions G, the third color filtering regions B and the transparent regions W is not limited FIG. 2. The arrangement of the first color filtering regions R, the second color filtering regions G, the third color filtering regions B and the transparent regions W may be modified depending on different design requirements.

In the present embodiment, the white light L passing through the first substrate 100 can travel to and then pass through the first color filtering regions R, the second color filtering regions G, and the third color filtering regions B so that the micro electro mechanical display module 1000 of the present embodiment can display a colorful image. It should be noted that the problem of color breakup in the conventional micro electro mechanical display may be overcome due to the light source 200 can provide a continuous white light in display duration.

In the present embodiment, the transparent regions W allow all of the white light traveling to the transparent regions W to pass through the color filter layer 320 so that the total amount of the white light passing through the first substrate 100 and the color filter layer 320 doesn't seriously decrease through the transparent regions W of the color filter layer 320. Accordingly, the micro electro mechanical display module 1000 of the present embodiment has good brightness.

The color filter layer 320 of the present embodiment may have a light-shielding region 330. The light-shielding region 330 is configured to avoid unexpected light from passing through each gap between two adjacent color filtering regions R, G and B. For example, as shown in FIG. 2, the light-shielding region 330 is made at a shape to cover the data lines DL and the scan lines SL. Accordingly, a light reflected by the data lines DL or the scan lines SL may be blocked by the light-shielding region 330 so that the optical performance of the micro electro mechanical display module 1000 of the present embodiment is not affected by the reflected light. Moreover, the light-mixing between any two adjacent color filtering regions R, G and B can be avoided by the light-shielding region 330. In the present embodiment, the material of the light-shielding region 310 may be a black resin. However, the invention is not limited thereto.

According to the above disclosure, the micro electro mechanical display module of the exemplary embodiment can overcome the problem of color breakup in the conventional micro electro mechanical display through the cooperation of the light source provided white light and a color filter layer. In additional, the problems of light-mixing and light-reflecting by metal lines can be also overcome by the light-shielding region.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A micro electro mechanical display module, comprising:
   a first substrate, comprising:
      a first substrate body;
      a light-shielding pattern layer, disposed on the first substrate body and has a plurality of first openings;
      a plurality of light-shielding units, disposed above the light-shielding pattern layer, wherein each of the light-shielding units comprises a light-shielding shutter having at least one second opening and is movable relative to the light-shielding pattern layer;
   a light source, disposed below the first substrate for providing white light; and
   a color filter layer, disposed in an optical path of the white light, wherein when one of the light-shielding units is enabled, the second opening of the light-shielding shutter is aligned with one of the first openings, so that the white light provided by the light source passes through the light-shielding pattern layer and the one of the light-shielding units and then passes through the color filter layer; and when the one of the light-shielding units is not enabled, the second opening of the light-shielding shutter is not aligned with the one of the first openings, so that the white light provided by the light source is blocked by the light-shielding shutter.

2. The micro electro mechanical display module of claim 1, wherein the color filter layer has a plurality of first color filtering regions, a plurality of second color filtering regions, a plurality of third color filtering regions, and a plurality of transparent regions covering the light-shielding units.

3. The micro electro mechanical display module of claim 2, wherein the first color filtering regions are a plurality of red filtering regions, the second color filtering regions are a plurality of green filtering regions, the third color filtering regions are a plurality of blue filtering regions, and the transparent regions are a plurality of third openings.

4. The micro electro mechanical display module of claim 1, wherein each of the light-shielding units further comprises an active device, the active device is capable making the light-shielding shutter relatively move for the light-shielding pattern layer.

5. The micro electro mechanical display module of claim 4, wherein each of the light-shielding units further comprises an actuator connecting to the light-shielding shutter, when the one of the light-shielding units is enabled, there is a voltage difference between the actuator and one drain of the active device, the actuator is attracted by the drain of the active device so that the light-shielding shutter relatively moves for the light-shielding pattern.

6. The micro electro mechanical display module of claim 4, wherein each of the light-shielding units further comprises an actuator connecting to the light-shielding shutter, when the one of the light-shielding units is not enabled, there is substantially no voltage difference between the actuator and one drain of the active device.

7. The micro electro mechanical display module of claim 6, wherein the actuator is a metal elastic device.

8. The micro electro mechanical display module of claim 4, further comprising:
a plurality of data lines and a plurality of scan lines, the data lines and the scan lines are disposed on the first substrate and interlaced, a plurality of sources of the active devices are electrically connected to the data lines, and a plurality of gates of the active devices are electrically connected to the scan lines.

9. The micro electro mechanical display module of claim 8, wherein the color filter layer has a light-shielding region covering the data lines and the scan lines.

10. The micro electro mechanical display module of claim 1, wherein the first substrate is disposed between the light source and the color filter layer.

11. The micro electro mechanical display module of claim 10, further comprising: a second substrate, the color filter layer is disposed on the second substrate, and there is a gap between the first substrate and the second substrate.

* * * * *